US012776544B2

(12) United States Patent
Haavikko et al.

(10) Patent No.: US 12,776,544 B2
(45) Date of Patent: Oct. 27, 2026

(54) SCALABLY STRUCTURABLE BATTERY PACK

(71) Applicant: AURORA POWERTRAINS OY, Rovaniemi (FI)

(72) Inventors: Olli Haavikko, Sinettä (FI); Matti Autioniemi, Rovaniemi (FI); Jori-Jaakko Niskanen, Rovaniemi (FI)

(73) Assignee: AURORA POWERTRAINS OY, Rovaniemi (FI)

( * ) Notice: Subject to any disclaimer, the term of this patent is extended or adjusted under 35 U.S.C. 154(b) by 595 days.

(21) Appl. No.: 18/264,016

(22) PCT Filed: Feb. 2, 2022

(86) PCT No.: PCT/FI2022/050064
§ 371 (c)(1),
(2) Date: Aug. 2, 2023

(87) PCT Pub. No.: WO2022/167725
PCT Pub. Date: Aug. 11, 2022

(65) Prior Publication Data
US 2024/0113375 A1 Apr. 4, 2024

(30) Foreign Application Priority Data
Feb. 3, 2021 (FI) ...................................... 20215113

(51) Int. Cl.
*H01M 50/258* (2021.01)
*H01M 10/613* (2014.01)
(Continued)

(52) U.S. Cl.
CPC ....... *H01M 50/258* (2021.01); *H01M 10/613* (2015.04); *H01M 10/6554* (2015.04);
(Continued)

(58) Field of Classification Search
CPC ............. H01M 50/258; H01M 10/613; H01M 10/6554; H01M 10/6556; H01M 10/6562;
(Continued)

(56) References Cited

U.S. PATENT DOCUMENTS 6,042,961 A 3/2000 Verhoog
2011/0212355 A1 9/2011 Essinger
(Continued)

FOREIGN PATENT DOCUMENTS

CN 208655740 U 3/2019
DE 102009053506 A1 5/2011
(Continued)

OTHER PUBLICATIONS

International Search Report and Written Opinion received for PCT Serial No. PCT/FI2022/050064 on Jun. 1, 2022, 11 pgs.
(Continued)

*Primary Examiner* — Adam A Arciero
(74) *Attorney, Agent, or Firm* — Merchant & Gould P.C.

(57) ABSTRACT

A scalable battery pack includes at least one battery module, a housing around each battery module, and heat exchangers, which are plate-shaped, and which locate on XY-planes of the battery modules. The present scalable battery pack also includes end pieces, which locate on both YZ-planes of each battery module, where the end pieces of adjacent battery modules in the X-direction are connectable, lockable and releasable by connectors. Such a connection can be made manually. The connection in the Y-direction between the battery modules may be made by external fastening pieces attached on the end pieces.

9 Claims, 4 Drawing Sheets

(51) Int. Cl.

| | |
|---|---|
| ***H01M 10/6554*** | (2014.01) |
| ***H01M 10/6556*** | (2014.01) |
| ***H01M 10/6562*** | (2014.01) |
| ***H01M 10/6567*** | (2014.01) |
| ***H01M 50/211*** | (2021.01) |
| ***H01M 50/224*** | (2021.01) |
| ***H01M 50/262*** | (2021.01) |
| ***H01M 50/503*** | (2021.01) |

(52) U.S. Cl.
CPC ... *H01M 10/6556* (2015.04); *H01M 10/6562* (2015.04); *H01M 10/6567* (2015.04); *H01M 50/211* (2021.01); *H01M 50/224* (2021.01); *H01M 50/262* (2021.01); *H01M 50/503* (2021.01); *H01M 2220/20* (2013.01)

(58) Field of Classification Search
CPC .......... H01M 10/6567; H01M 50/211; H01M 50/224; H01M 50/262; H01M 50/503; H01M 2220/20; H01M 10/625; H01M 10/647; H01M 50/249; Y02E 60/10
See application file for complete search history.

(56) References Cited

U.S. PATENT DOCUMENTS

| | | | | |
|---|---|---|---|---|
| 2011/0293974 | A1 | 12/2011 | Yoon | |
| 2013/0143093 | A1 | 6/2013 | Teng | |
| 2013/0224524 | A1 | 8/2013 | Nam | |
| 2016/0233465 | A1 | 8/2016 | Lee | |
| 2016/0359206 | A1 | 12/2016 | Eberleh | |
| 2018/0006470 | A1 | 1/2018 | Stacey | |
| 2020/0203786 | A1 | 6/2020 | Athanikar | |
| 2020/0381694 | A1* | 12/2020 | Rath | H01M 10/6554 |
| 2021/0143508 | A1* | 5/2021 | Yoshida | H01M 50/291 |

FOREIGN PATENT DOCUMENTS

| | | | |
|---|---|---|---|
| DE | 102018119545 | A1 | 2/2020 |
| EP | 1143541 | A1 | 10/2001 |
| EP | 2544294 | A1 | 1/2013 |
| EP | 2871694 | A1 | 5/2015 |
| EP | 2916366 | A1 | 9/2015 |
| EP | 2980913 | A1 | 2/2016 |

OTHER PUBLICATIONS

Finnish Search Report received for FI Serial No. 20215113 on Sep. 28, 2021, 2 pgs.
Finnish Office Action received for FI Serial No. 20215113 on Feb. 27, 2023, 8 pgs.
Finnish Office Action received for FI Application No. 20215113 on Jun. 6, 2024, 11 pgs.

* cited by examiner

SCALABLY STRUCTURABLE BATTERY PACK

CROSS-REFERENCE TO RELATED APPLICATIONS

This application is a National Stage Application of PCT/FI2022/050064, filed Feb. 2, 2022, which claims benefit of Ser. No. 20/215,113, filed Feb. 3, 2021, in Finland and which applications are incorporated herein by reference. To the extent appropriate, a claim of priority is made to each of the above disclosed applications.

TECHNICAL FIELD

The present invention relates to battery packs applicable in various different uses, concerning on how to pack battery modules within the battery packs efficiently and scalably. The present invention relates also to application areas of such battery packs, such as electric on-road and off-road vehicles, and various other electric-driven devices, machines and tools.

BACKGROUND

Limited space is a very basic and common problem or at least a restrictive condition, when designing batteries and battery assemblies for a variety of usages. Especially for electrically driven vehicles, such as electric cars, this problem is a crucial boundary condition in the whole design process. The same problem relates to all situations where the battery assembly needs to be fit in a given shaped housing (e.g. in volumes determined by non-planar walls) or in a very limited space within the housing of the device. The required battery assemblies may need to have a relatively large size compared to a volume of the whole vehicle or of the other type of housing in order to ensure enough battery capacity and power, and therefore, the energy density is usually desired to be maximized for the battery assembly in view of the used volume. In other words, spare volume or volumes with no functional effects within the whole battery assembly are desired to be minimized.

Pouch cells have been known since 1995. They comprise conductive foil tabs welded to respective electrodes, sealed in a pouch structure where the positive and negative terminals are carried outside of the pouch. The electrodes can be separated by e.g. insulating foils, and the electrodes can be pressed in a compact manner in a roll-form or in a stack-form to the relatively thin pouch. The basic form of a pouch cell is rather thin, planar piece of plate, where the positive and negative terminals are extruded from one thin edge of the pouch cell, or possibly from opposite edges.

In the following terminology, we define that a battery module comprises several battery cells (like pouch cells). Furthermore, a battery pack comprises a number of battery modules, which can be stacked in X-, Y-, and/or Z-directions.

A main problem in designing battery packs in e.g. vehicular use is the applicability requirement with the IP code (i.e. Ingress or International Protection Code/IEC 60529; or European standard EN 60529). A purpose of the invention is to reach the classification of IP67 with the battery modules. This design task is a problem among all the development work relating to the battery modules.

Actually, in prior art, there have been used battery modules not satisfying IP67 requirements as such, but after proper design of the supporting (outer) structures within the battery pack, they have been able to create a battery pack satisfying IP67 requirements. Thus, various (concerning IP classification related quality) battery modules as such could be used as part of the manufactured end product (=battery pack), but a single module would not be IP67 compliant necessarily. This is a drawback. Also a further drawback is that the outer, supporting structure must be especially robust in order to change the IP classification into IP67. This might usually mean robust connection systems in the outer housing and maybe in the inner structure as well, meaning that the energy density of the resulting battery pack is not optimal. This is another drawback in this context.

Various products have been developed and in the market already in this highly developed technical field. One of them is XPAND Modular Pack (XMP) by Xalt Energy, namely XMP111E, model F960-0009. This device seems to be a scalable product where the presented module's size is around 75 cm*30 cm*28 cm. Xalt's product applies liquid cooling as thermal management system of the battery module. Xalt's battery module is also stated to be IP67 compliant, with mated connectors. The battery pack is designed for commercial truck, bus and heavy duty transportation, and marine and stationary applications. The AMBA19 White paper on this product shows some relevant specifications on this product, comprising performance, and environmental, safety and abuse tolerance parameters.

US 2016/0233465 ("Lee") discloses a battery module, which has a simple structure and light design and which is strong against impacts and vibrations. Lee's structure has coupling protrusions within the housing, and coupling grooves in the cartridges which fit into each other, and thus, couple these two parts together. Impact stress will focus on these coupling components. The housing with coupling elements has been divided to an upper housing and lower housing. FIG. 2 illustrates the general structure of the battery module, and FIGS. 7-8 illustrate the coupling elements' connection principle. Vehicular use has been mentioned as Lee's application area.

US 2018/0006470 ("Stacey") discloses a modular battery system, where there is a battery and internal circuitry. A control module comprises power inlet and outlet, and internal charge-and-discharge electrical components. The battery module comprises a top seat which connects to the internal charge-and-discharge electrical components allowing the battery to be charged and discharged.

US 2013/0143093 ("Teng") discloses a battery cooling plate and respective cooling system, applicable e.g. for vehicular battery system. In between the battery cells there is a cooling channel system, which may have several differently shaped piping branches (see FIGS. 4 and 5*a*).

US 2016/0359206 ("Eberleh") discloses a battery module, where there are stackable battery cells and a cooling module. There are also damper layers on individual battery cells formed by foam-like silicone, which smoothens the forces affecting on the single cell.

The problem in these products is that their IP67 compatibility is still in doubt. Also, a good energy density is a vital characteristic. IP67 requirements comprise full protection against dust and sand (any solid objects), and also such a device would work at least for 30 minutes under water (being in 15 cm . . . 1 m depth).

SUMMARY

The present invention introduces a scalable battery pack (3). The battery pack (3) comprises:

at least one battery module (1), a housing (2) around each battery module (1), and heat exchangers (4), which are plate-shaped, and which locate on XY-planes of the battery modules (1).

The battery pack (3) is characterized in that the battery pack (3) further comprises end pieces (5), which locate on both YZ-planes of each battery module (1), where the end pieces (5) of adjacent battery modules (1) in the X-direction are connectable, lockable and releasable by connection means.

In an embodiment of the present invention, the connection means in the end pieces (5) comprise two connection grooves (6) symmetrically to one another in a first battery module, and respective locking pins (7) symmetrically to one another in a second battery module.

In an embodiment of the present invention, the connection means comprises a spigot shaft (8), which allows for rotating either of the first or the second battery module around a central horizontal axis so that the locking pins (7) will be set in the connection grooves (6) when the connection is performed.

In an embodiment of the present invention, the connection means comprises an unlocking prohibiting mechanism which is adjustable on the end piece (5) after the connection has been made between the two battery modules (1).

In an embodiment of the present invention, an XZ-directed top plane of the battery pack (3) comprises at least one of I/O connections (10), pressure balancing and ventilation system (11), coolant pipes (12), positive and negative terminals (9) and current connectors (13).

In an embodiment of the present invention, the current connectors (13) have smaller height compared to their longitudinal dimension, and the current connectors (13) connect adjacent battery modules (1) together in X- or Z-direction.

In an embodiment of the present invention, the current connectors (13) have flat top surface, and they are made of polymer or metal, therefore enduring mechanical pressure from the above battery modules (1).

In an embodiment of the present invention, the housing (2) is made of a metal with large thermal conductivity.

In an embodiment of the present invention, the heat exchangers (4) comprise at least a partially spiraling route for a coolant, locating on a vertical plane between each adjacent battery module (1).

In an embodiment of the present invention, the battery pack comprises intermediate plates between the battery modules (1).

In an embodiment of the present invention, the battery pack comprises material with good thermal conductivity between the battery modules (1), combined with air flow in contact with the outer surfaces of the battery pack.

In an embodiment of the present invention, the battery pack comprises strips of material between the battery modules (1), which allow cooling air to be flowed between the strips of material between the battery modules (1).

In an embodiment of the present invention, the physical connection between adjacent battery modules (1) in the Y-direction is enhanced by using external fastening pieces, which are attached on the end pieces (5) locating on the YZ-planes of the battery modules (1).

DETAILED DESCRIPTION

Figure 1:
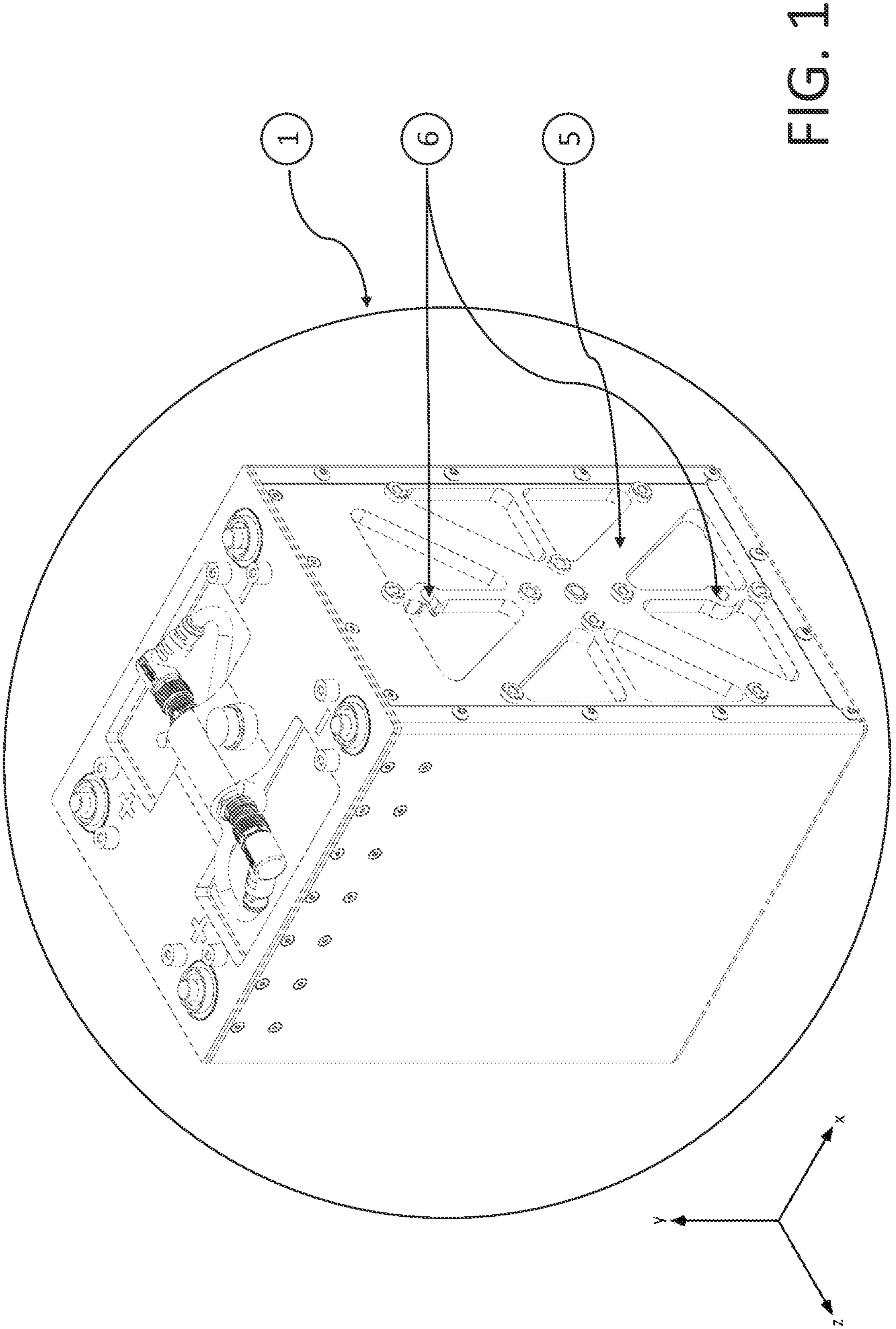
FIG. 1 illustrates an example of a battery module according to the present invention, showing an end piece with its connections grooves.

The present invention introduces a scalable battery pack, where a plurality of battery modules are connectable together in a robust but yet volume-efficient way. The space available for a battery pack is restricted in various possible applications, such as in vehicular use, and therefore there is a need to design a battery pack with a good energy density. Also the battery pack requires quite large portion of the available inner volume of the vehicle housing, so therefore its energy density optimization is very beneficial. Maximizing the energy density means maximizing the volume of the areas where the chemical battery reactions take place, and minimizing the areas which are meant for auxiliary functions, such as connections and cooling of the system. All this must of course be designed so that the whole system works as specified, is safe to use, and is robust to handle various external forces, impacts and vibrations.

Usually the battery pack comprises several battery modules. The battery module in turn comprises several battery cells, which can be commonly known pouch cells according to their type. When battery cells are each stacked in vertical cell plane alignment along a horizontally directed line and in adjacent fashion, the resulting battery module is a hexahedron. Such battery modules can be assembled together so that the resulting battery pack will have a desired X-dimension (width), a desired Y-dimension (height) and a desired Z-dimension (depth). Thus, the resulting battery pack will also generally be a hexahedron, where the used total volume is desired to be optimized i.e. as small as physically possible.

In other words, the user or battery manufacturer can select the size of the battery pack according to the needed battery capacity and based on available space in the application at hand. Thus, it can be said that the battery pack is in principle freely scalable in all three dimensions.

As discussed in the background, the quality requirement of IP67 is a criterion, which is important in battery packs used in various vehicular applications. The design principles next are desired to follow this guidance so that the resulting end product will satisfy the IP67 requirements. In the present invention, according to an embodiment, the used battery modules as such are all IP67 compliant. This makes it possible to have any size of modular battery pack, even 1*1*1 sized battery pack (=a single module). Thus, the size of the battery pack can be basically anything, and the dimensions are freely scalable based on the used application and based on the available space for the battery pack. Because each battery module is IP67 compliant, the connection mechanism between them can be basically supportive, and thus lighter, and therefore, it can be designed to be volumetrically effective (i.e. small in size). The lighter connection mechanism is also one enabler for scaling the battery pack to any desired size. Lighter connection mechanism has also the advantage of being more cost-effective.

We discuss the connection principles between the battery modules of the battery pack next in detail. Excessive thermal energy handling within the battery pack is also discussed in this context.

FIG. 1 illustrates an example of a battery module 1 applicable in the present invention. It is a rectangularly i.e. hexahedronally shaped unit. We concentrate here on the end surfaces of the battery module 1 locating on the YZ-plane according to the coordinate system shown in FIG. 1. In other words, we discuss the parts and mechanical characteristics and features, which enable the physical connection between two adjacent battery modules 1 along the X-axis. This connection principle can be used for creating a larger row of battery modules, i.e. a first vertical plane of the battery module 1 has a first structure and the opposite, second vertical plane of the battery module 1 has a second structure, which fits with the first structure.

The battery module 1 has an end piece 5 in both two ends aligned in the direction of the YZ-planes. The end pieces 5 are manufactured from enduring, but relatively light metal concerning its intrinsic mass. The planar end piece 5 has a certain mechanical design in order to smoothen the compression forces between the adjacent battery modules 1. The compression along this direction (X-direction) also focuses on the large surface areas of the pouch cells within the battery module. Still, the present invention is not restricted only to the design shown in the FIGS. 1-4, as many other variations are possible to fulfil the above mentioned criterion.

Another main purpose of the end piece 5 is to provide mechanical connection possibilities between two adjacent end pieces 5 locating in two sequential battery modules 1. In this sense, the main feature is that the end piece 5 comprises two connection grooves 6 symmetrically to one another, when looked in view of the symmetry point, i.e. a horizontal central axis, i.e. a spigot shaft 8 (marked in FIG. 3, see later) in the middle of the end piece 5.

The opposite surface of this battery module (not shown in the view shown in FIG. 1) is also the same as the respective surface of the next battery module which is to be connected with the shown end piece 5 of battery module 1. The opposite surface comprises two locking pins 7 (shown in more detail in FIG. 3). The locations of the locking pins 7 on the opposing end piece will correspond to the locations of the connection grooves 6. Also, the opposing end piece comprises a short shaft stub (see FIG. 3) which can be set against the spigot shaft 8 (shown as a hole in the center of the end piece 5). Thus, the distances from the locking pins 7 to the central axis are mutually the same, and also the same as the distances from the connection grooves 6 to the hole on the central axis.

Now with this kind of arrangement, the assembler(s) (i.e. the user(s)) of the battery pack may combine battery modules along rows in the X-direction as follows. The two connectable elements can be placed so that a first module is held by a first person, and a second module is held by a second person. Alternatively, the first module could be put e.g. on a table, near the edge of it, in a normal upright position. The connection between the two elements is made by first rotating the second module slightly around the central horizontal axis. If the first module is the one shown in FIG. 1, then the second module to be connected from the viewer's side would have to be rotated slightly to a counter-clockwise direction. Then the short shaft stub can be inserted into the hole, so that the central axes of the two modules are aligned i.e. on the same line. Then as a third step, the second module can be rotated to a clockwise direction so that the locking pins 7 of the second module will snap into the respective connection grooves 6 of the first module. The two modules can be kept in contact with one another with a proper manual pushing force, so that the shaft stub remains in the hole, and thus guides the locking pins 7 right into the connection grooves 6. The connection can be ensured by adding an unlocking prohibiting mechanism which is adjustable on the end piece 5 after the connection has been made between the two battery modules 1. This can be an additional or a turnable mechanical piece on the end piece 5, where the mechanical piece may hinder the opening of the connection. The mechanical piece may be set right onto the mouth of the connection groove 6, so that unlocking of the two battery modules couldn't be done without first turning the mechanical piece away to the side. The end result of the connection between the two battery modules is a very robust, and vibration- and impact-lasting connection, where the external impacts will largely focus on the end pieces 5 themselves, and to the outer housing 2 of the battery module as well (see FIG. 2 later).

The above connection principle can be used similarly to the next battery module to be connected with the already connected "line or row" of battery modules. Thus, the length of the battery pack in the X-direction is scalable and selectable freely based on the application area, and the assemblers' intentions during the assembly of the battery pack.

Figure 2:
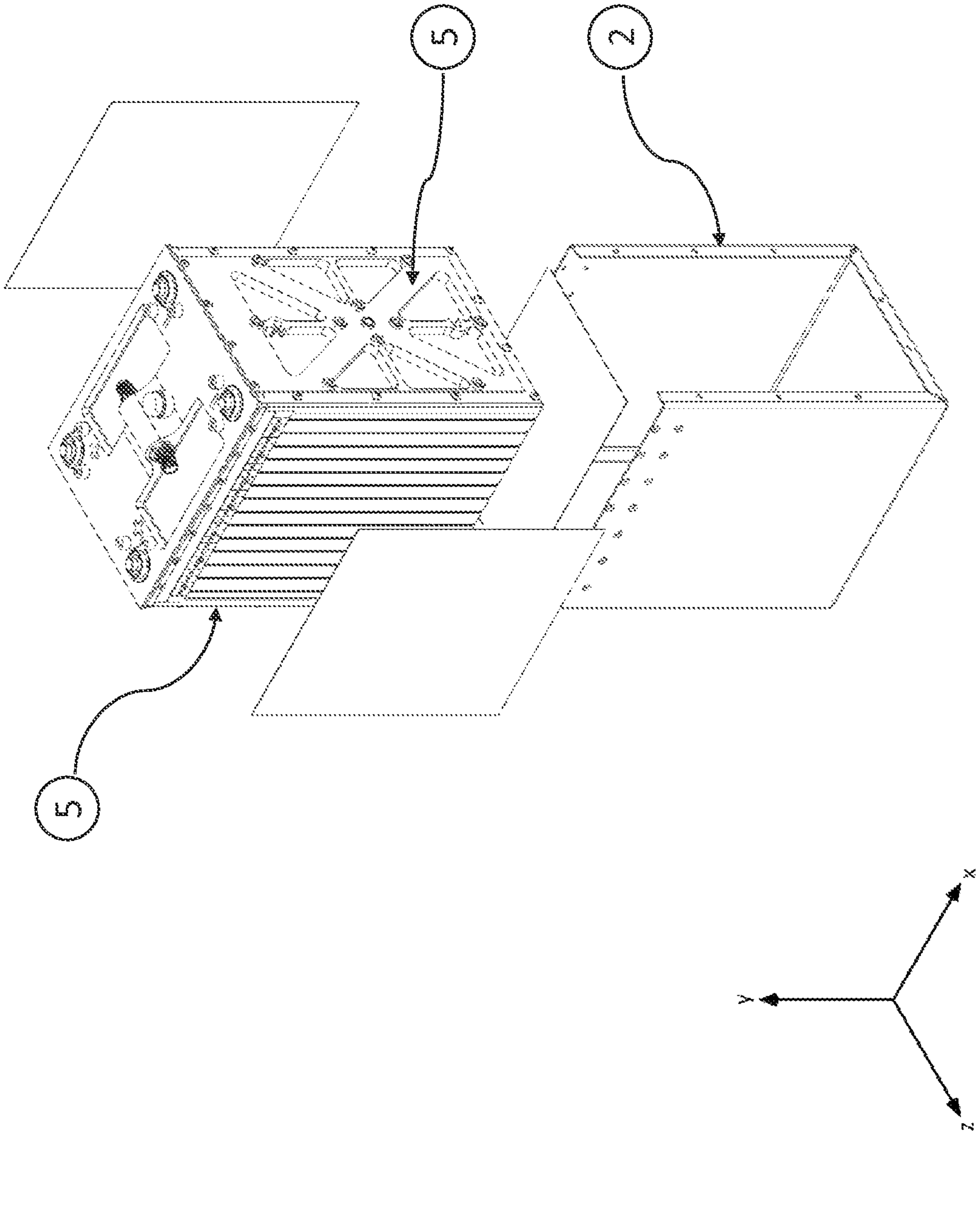
FIG. 2 illustrates a housing for the battery module with some intermediate plates.

Next we proceed to describing an embodiment of the present invention shown in FIG. 2. In there, the battery module 1 and its end pieces 5 are similar as described above in the context of FIG. 1. We concentrate here on the rest of the shown elements. The two XY-planes of the battery module 1 can be provided with intermediate plates, thus locating in a vertical alignment as shown in the figure. The bottom face of the battery module (i.e. the bottom XZ-plane) can also be provided with an intermediate plate. The intermediate plates can be manufactured from metal, e.g. aluminium, for obtaining good thermal conductivity and a route for excessive thermal energy to proceed (i.e. conduct) from the pouch cells towards the outer surfaces of the battery pack itself. The intermediate plates having good thermal conductivity enable this, and they provide also some mechanical cover on the side edges of the pouch cells (as shown in the figure). As the end pieces 5 fill two side edges and the top edge has connectors and other technical parts as well (discussed in FIG. 4), it is reasonable to leave these side surfaces without the intermediate plate.

FIG. 2 also illustrates a housing 2, which can be placed around each battery module 1. It is a U-shaped surrounding cover, which may have flange section turned in 90 degrees angle, for enabling connection with the battery module 1. As FIG. 2 shows, there are ten screw holes in the housing 2 on the YZ-plane through the flange section, through which the connection can be made to the battery module 1. The XY-planes may have a plurality of further screw holes for attaching the top part of the housing 2 into the battery module 1 from the XY-planes. In this example there are 2*7=14 screw holes near the top edge of the housing 2, but this is merely a single example, and many other attachment options and numbers of attachment locations are possible.

The dimensions of the intermediate plates can be determined so that the lower row of connection holes along the XY-planes will remain accessible i.e. the top edge of the intermediate plate may locate just below the lower row of the connection holes.

In an embodiment of the present invention, the housing 2 is manufactured of relatively light, and thermally conductive metal. In an embodiment, the selected metal is aluminium.

Figure 3:
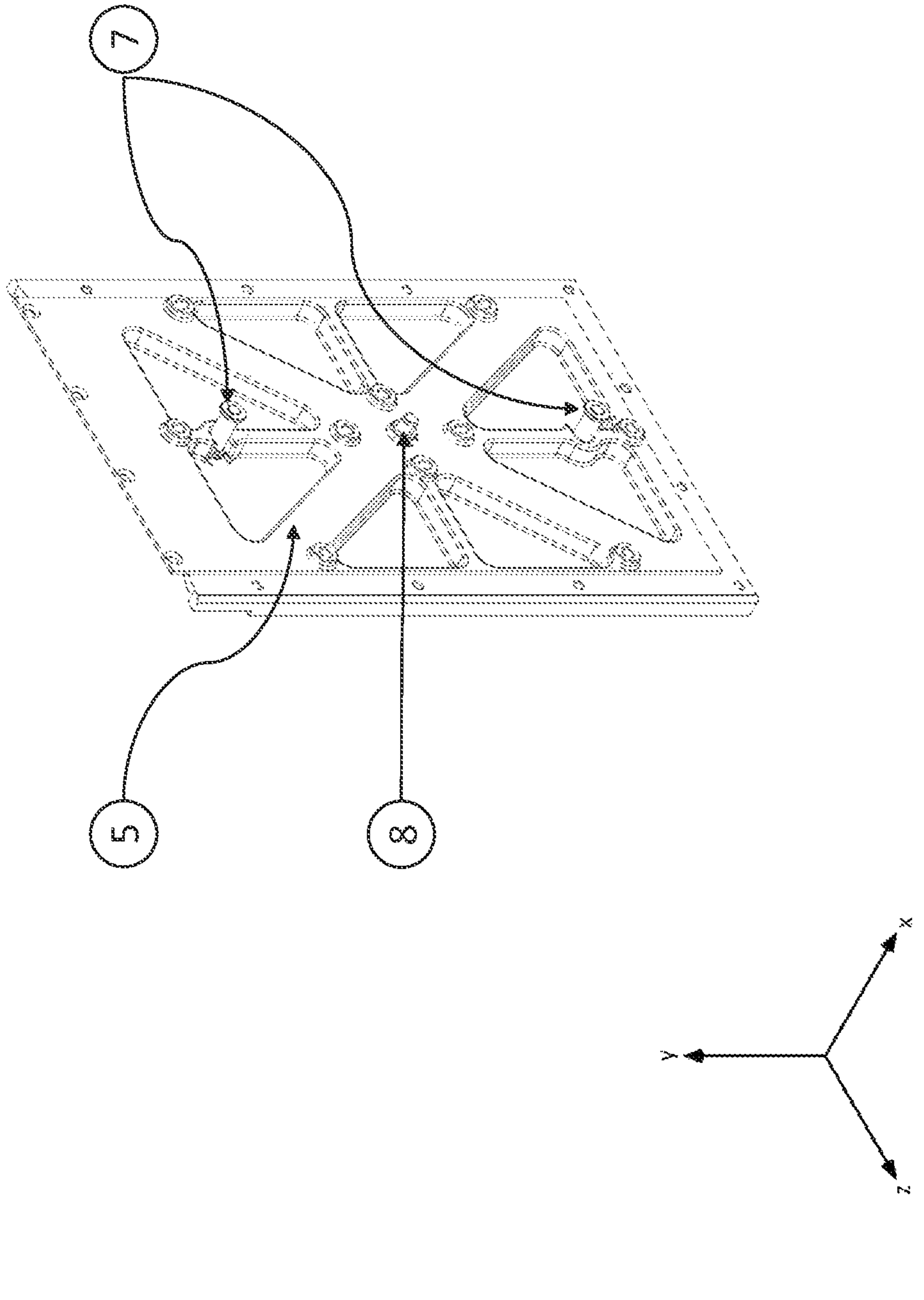
FIG. 3 illustrates yet another view of the end piece, showing also two locking pins, and a spigot shaft.

Now we proceed to FIG. 3. This figure illustrates the attachment principle between the end pieces 5 in view of the counter-piece attaching against the end piece 5 shown in FIG. 1. Thus, the shown end piece 5 of FIG. 3 is the same, which is on the unshown YZ-plane of the battery module 1 of FIG. 1. The working principle in the attachment of two successive battery modules 1 has been described in fine detail earlier in connection to FIG. 1, but anyhow, one example of the counter-element structure is shown here. This end piece 5 comprises certain support structure, here resembling a bit like the UK flag patterns, but of course, some other support bar structure is possible. A condition is that the end piece 5 must be robust, and it must bear the rotating and pressing forces, which are involved in the attachment process.

The counter end piece 5 comprises a spigot shaft 8, which is shown as a short shaft stub in the center of the end piece 5. This protrusion can be set in the hole shown in the center of the end piece 5 shown in FIG. 1. Furthermore, the counter end piece comprises two locking pins 7 locating symmetrically to one another around the center axis. The locking pin 7 can be a fixed protrusion in the counter end piece 5, which could be pressed into the connection grooves 6 of the other end piece 5 (shown in FIG. 1), when a rotational force is applied the way described in FIG. 1's description above. On the other hand, the locking pin 7 could be a separate piece made of metal or hard polymer, which could even have some elastic properties on the top surface of the piece for the proper connection and "clicking" in the connection groove 6. The separate piece could be connected to the end piece 5 and the attachment quality needs to be good for the attachment between the battery modules 1 to be good as well. In case of a metal-made separate piece, it could be welded on the end piece's support bar, as shown in FIG. 3. There could be some distinct locking mechanism for the separate piece, which could require some turning motion. This would be handy, if the end piece is not made of metal. Anyway, the locking pin 7 needs to be fixedly connected with the counter end piece 5, in order to allow robust, durable and strong end pieces 5, which can be affected with manual (pushing and rotational) forces created by the battery pack assembler. Also, the battery pack must bear the forces in the actual use situations e.g. as part of the moving and bumping vehicle, so therefore the mechanical quality of the connective elements is of utmost importance.

FIG. 3 also shows the screw-holes through which the housing 2 can be attached through the flange section (shown in FIG. 2) to the counter end piece 5. Of course, the same connection principle applies with the end piece 5 shown in FIG. 1.

As the connection groove length is relatively small, only quite small rotational action is required for the locking pins 7 to click and fix within the connection grooves 6. It can be well performed by a single battery pack assembler by a relatively small manual action.

Figure 4:
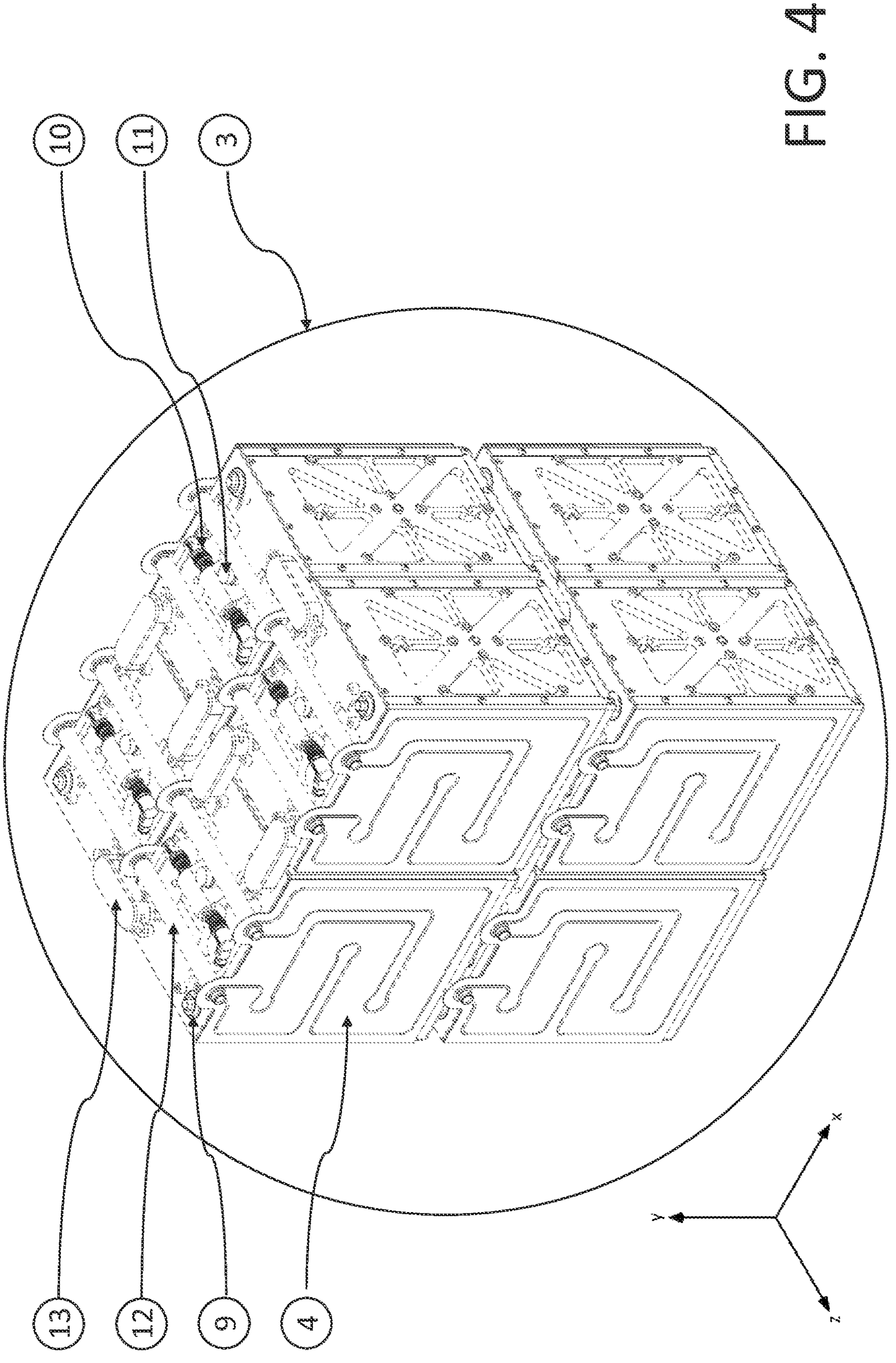
FIG. 4 illustrates a group of battery modules assembled together, where a cooling system with plate-like heat exchangers are shown, together with current connectors.

Now progressing to FIG. 4, it illustrates an example of a final battery pack 3. In this example, the battery pack is created as 2*2*2 battery module "matrix", but this is merely just one possible example, as we have emphasized that the battery pack can be assembled as a freely scalable unit. Parts 4 and 9-13 are now explained in more detail.

The battery pack 3 comprises heat exchangers 4, which can be plate-shaped, and which may locate on XY-planes of the battery modules 1, i.e. between adjacent battery modules in each XY-plane-aligned gap. The plate-shaped heat exchanger 4 may be formed like a curved pipe. If the cross-sectional area within the piping is looked at, it is preferably selected to be as large as possible in view of the module's XY-plane-aligned end wall. As FIG. 4 illustrates, the cross-sectional area of the piping can be selected to be over 50% of the total XY-plane surface of a single battery module. Therefore, the same condition will be approximately fulfilled also for the total XY-surface of the battery pack (comprising here four modules in the visible XY-aligned surface plane; and eight modules in total). The large cross-sectional area of the piping will make the thermal energy transfer (i.e. the cooling) more efficient. FIG. 4 illustrates the front view along the Z-axis, where four heat exchangers 4 are placed on the front XY-planes of the respective battery modules 1. As a generalization for the piping above, the heat exchanger 4 comprises a route for air or liquid to flow through. The flowing substance can be also called as a coolant. The coolant can be directed to the piping or other kind of route of the heat exchanger 4 via pipes 12. They can also be called as coolant pipes 12. In an embodiment, the pipes 12 may be suitable for circulating water through the heat exchanger 4. Some other coolant may be selected in some other embodiments. The main purpose of the heat exchangers 4 is that the excessive thermal energy created due to chemical reactions inside the battery modules can be conducted off from the battery pack 3. The pipes 12 may direct the water or other coolant to another element which cools the water once again. After this cooling process outside the battery pack 3, the same coolant material now having a cooler temperature can be directed once again to the incoming pipes 12 and to the heat exchangers 4. Thus, the heat exchanging system can be made as a closed system, in an embodiment of the invention.

As visible in FIG. 4, all gaps between the adjacent battery modules 1 along the Z-axis direction can be provided with heat exchangers 4 in an embodiment of the present invention, together with the end surfaces as well (=the end surfaces of the battery modules, which are simultaneously also outer surfaces of the whole battery pack 3). With such a configuration, there are enough thermally conductive paths from various inner sections of the whole battery pack towards the outer side of the battery pack. This ensures proper functioning of the battery pack, as the inner temperature of the battery pack can be well controlled.

In the shown embodiment, the pipes 12 meant for the coolant (inwards and outwards route) may locate along the top horizontal surface of the battery pack. However, some other locations for the pipes 12 are also possible, and the pipes may well have some vertical or curved sections as well, depending on the desired arrangement.

In a preferred embodiment, it is not meant that the above layer of battery modules 1 would press against the topmost part of the pipes 12. Instead, the gravimetric pressure from the above battery modules 1 is meant to be directed onto the flat top surfaces of current connectors 13 and in the corner areas also to the terminals 9. These details are discussed more in the following.

Now proceeding to the rest of the elements, which are shown as elements 9, 10, 11, 13 visible along the top surface of the battery pack 3, we note the following. In an embodiment of the present invention, the top surface i.e. plane of the battery pack 3 comprises positive and negative terminals i.e. electrodes 9 of the battery modules 1. There may be four electrodes per a battery module 1, as in the illustrated embodiment of FIG. 4. In the illustrated embodiment, the positive and negative terminals 9 locate near the corners of the battery module 1. The corner areas have the advantage that the interconnections between terminals in adjacent battery modules can be quite easily realized and the rest of the top area of the modules can be freed to other functional elements. Corners also offer a possibility to connect adjacent modules together in two or even three directions (three, if a diagonal one is connected), while the electrode location being in the center area of the edge means that only a single direction is possible to the interconnection. The negative and positive terminals 9 also make possible to connect battery modules 1 together in vertical direction. In practice, the electrode 9 may be manufactured as a vertical protrusion in the top surface of the battery module, and as a similarly shaped cavity in the bottom edge of the battery module 1. Thus, the battery modules 1 can easily be stacked in a way that the electrode protrusions and cavities will fix into one another between different module layers.

Furthermore, in the illustrated embodiment, current connectors 13 may be applied on the top surface of a battery module layer for interconnecting horizontally adjacent modules. Current connectors 13 may be flat, horizontally aligned pieces comprising electrically conductive route between two electrodes. The distance between the electrode spots in the current connector 13 needs to be two times the distance from the protrusion 9 to the nearest edge of the module 1. This way the current connector 13 sets on top of the protrusions i.e. terminals 9 of the adjacent modules 1. The Y-dimension i.e. the height of the current connector 13 is preferable made as small as possible, for maintaining the energy density of the battery pack 3 as good as possible. In other words, the dimensions of the connection "tools" should be minimized (here concerning the Y-dimension), in order to maximize the relative portion of the volume, where the actual chemical reactions will take place within the whole battery pack.

In an embodiment, the current connectors 13 are manufactured from a relatively hard and robust material so that the current connectors 13 are able to handle mechanical forces applied on top of them. This means that the current connectors 13 should not mechanically break under pressure from the above battery modules 1. Thus, the battery modules 1 can be set on top of one another so that the current connectors 13 form the main support sections between the modules 1 in the Y-direction, i.e. the gravitational forces due to the upper modules will be mainly set on top of the current connectors 13. Thus, it is advantageous that the top surface of the current connectors 13 is flat and horizontally aligned. One material option of the top surface of the current connector 13 is hard polymer. Another option would be metal, but then the metal surface must be isolated electrically from the electric wiring between the actual terminals 9 connected by the current connector 13.

Furthermore, in an embodiment of the present invention, the top surface of the battery pack 3 comprises I/O connections 10, and/or a pressure balancing and ventilation system 11. The I/O connections 10 are in this embodiment available for each battery module 1. The pressure balancing and ventilation system 11 may also be applied in each battery module. It means that there is a valve or other controllable passageway in the top surface of the battery module 1 allowing an increased gaseous pressure to be released via the pressure balancing and ventilation system 11. The pressure may well increase due to the chemical reactions within the pouch cells, and therefore there needs to be a system with which the excessive gases can be released out from the battery modules 1. The valves or other passageways may be automized in a sense, that they will open, when a certain pressure threshold value is reached and exceeded inside the battery module 1.

In an embodiment, the housing 2 is made of a metal with large thermal conductivity.

In an embodiment, in case there are not heat exchangers 4 at all, the battery pack comprises intermediate plates between the battery modules 1.

In yet another embodiment, in case there are not heat exchangers 4 at all, the battery pack comprises material with good thermal conductivity between the battery modules 1, combined with air flow in contact with the outer surfaces of the battery pack.

In yet another embodiment, in case there are not heat exchangers 4 at all, the battery pack comprises strips of material between the battery modules 1, which allow cooling air to be flowed between the strips of material between the battery modules 1.

Back to FIG. 4, the physical connection between adjacent battery modules 1 in the Y-direction (i.e. vertical direction) may be enhanced by using external fastening pieces, in an embodiment of the present invention. These external fastening pieces may be attached on the end pieces 5 locating on the YZ-planes of the battery modules 1. In practice, such external fastening pieces will connect two adjacent battery modules 1 locating vertically in view of one another. The connection principle between each vertical pair of battery modules 1 can be further "chained" so that there is an external fastening piece between every vertical pair of battery modules 1. Thus, the physical connectivity between the horizontal module layers enhances, and the whole battery pack 3 will stand much more stress, vibrations and other impulse-like forces, when used e.g. in a vehicle. Furthermore, the external fastening pieces will ensure that the positive and negative terminals 9 and current connectors 13 acting as support surfaces will stay aligned and in place during external bumps etc., which may be commonly present in various use scenarios, and especially in vehicular use. These are advantages of the presented structure.

One further advantage of the present invention is that by centralizing the elements 9-13 to a single planar surface of the group of battery modules (in the examples: the top surface=the XZ-surface), the energy density of the battery pack can be maximized. This will also happen by minimizing the highest element height between the battery module layers in the Y-direction.

Yet another advantage is that by using the presented, mechanically robust current connectors 13, we are able to create a battery pack without excessive cable-based current connecting elements used in prior art. The use of low-height current connectors 13 will optimize the restricted space better for the actual active battery parts, i.e. maximize it. Thus, the present invention enables an optimized energy density for the whole battery pack usually designed to be applied in a restricted volumetric space.

A further advantage is that the battery pack is well scalable to any desired size and shape in X-, Y-, and Z-directions, whatever the application field and the volume/shape limits allowed for the battery pack are. This makes the presented battery pack very much a multi-purpose battery well suited for different uses, devices, machinery and to various kinds of vehicles.

The present invention is not restricted merely to embodiments presented above, but the present invention may vary within the scope of the claims.

The invention claimed is:

1. A scalable battery pack, determined in an orthogonal Cartesian coordinate system comprising an X-dimension concerning width, a Y-dimension concerning height and a Z-dimension concerning depth, comprising:

at least one battery module, a housing around each battery module, heat exchangers, which are plate-shaped, and which locate on XY-planes of the battery modules, end pieces, which locate on both YZ-planes of each battery module, wherein the end pieces of adjacent battery modules in the X-direction are connectable, lockable and releasable by one or more connectors, wherein the one or more connectors in the end pieces comprise two connection grooves arranged symmetrically to one another in a first battery module, and respective locking pins arranged symmetrically to one another in a second battery module, wherein each of the connectors comprises a spigot shaft, which enables rotating either of the first or the second battery module around a central horizontal axis so that the locking pins will be set in the connection grooves when connection is performed;

wherein an XZ-directed top plane of the battery pack comprises current connectors, wherein the current connectors have smaller height compared to a longitudinal dimension, and the current connectors connect adjacent battery modules together in an X-direction or a Z-direction; and wherein the XZ-directed top plane of the battery pack comprises at least two of the following: I/O connections, pressure balancing and ventilation system, coolant pipes, and positive and negative terminals.

2. The battery pack according to claim 1, wherein each of the connectors comprises an unlocking prohibiting mechanism which is adjustable on the end piece after connection has been made between the two battery modules.

3. The battery pack according to claim 1, wherein each of the current connectors has a flat top surface, and the current connectors are made of polymer or metal, configured to endure mechanical pressure from the battery modules.

4. The battery pack according to claim 1, wherein the housing is made of a metal.

5. The battery pack according to claim 1, wherein the heat exchangers comprise at least a partially spiralling route for a coolant, locating on a vertical plane between each adjacent battery module.

6. The battery pack according to claim 1, wherein the battery pack comprises intermediate plates between the battery modules.

7. The battery pack according to claim 1, wherein the battery pack comprises metal between the battery modules, combined with air flow in contact with outer surfaces of the battery pack.

8. The battery pack according to claim 1, wherein the battery pack comprises strips of material between the battery modules, which allow cooling air to be flowed between the strips of material between the battery modules.

9. The battery pack according to claim 1, wherein physical connection between adjacent battery modules in the Y-direction is ensured by using external fastening pieces, which are attached on the end pieces locating on the YZ-planes of the battery modules.

* * * * *